US009971313B2

United States Patent
Chung

(10) Patent No.: US 9,971,313 B2
(45) Date of Patent: May 15, 2018

(54) PROCESSOR PROCESSING SENSOR SIGNAL CORRESPONDING TO WRIST MUSCLE MOVEMENT AND DEVICES INCLUDING SAME

(71) Applicant: Hong Suk Chung, Seoul (KR)

(72) Inventor: Hong Suk Chung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days. days.

(21) Appl. No.: 14/731,034

(22) Filed: Jun. 4, 2015

(65) Prior Publication Data

US 2016/0062320 A1 Mar. 3, 2016

(30) Foreign Application Priority Data

Aug. 28, 2014 (KR) .......................... 10-2014-0112870

(51) Int. Cl.
| | |
|---|---|
| *G04G 21/00* | (2010.01) |
| *G04G 21/02* | (2010.01) |
| *G04G 21/08* | (2010.01) |
| *G06F 3/00* | (2006.01) |
| *G06F 1/16* | (2006.01) |
| *G06F 3/01* | (2006.01) |
| *G06F 3/0488* | (2013.01) |

(52) U.S. Cl.
CPC ........... *G04G 21/00* (2013.01); *G04G 21/025* (2013.01); *G04G 21/08* (2013.01); *G06F 1/163* (2013.01); *G06F 3/017* (2013.01); *G06F 3/0488* (2013.01)

(58) Field of Classification Search
CPC ...... G04G 21/00; G04G 21/025; G04G 21/08; G04F 3/017
USPC ........................................... 368/10, 281, 282
See application file for complete search history.

(56) References Cited

U.S. PATENT DOCUMENTS 6,285,757 B1 * 9/2001 Carroll .................. H04B 1/385
345/619
7,254,376 B2 * 8/2007 Park ....................... H04B 1/385
341/20

(Continued)

FOREIGN PATENT DOCUMENTS

JP            2010282575      12/2010
KR    1020050047329 A      5/2005

(Continued)

*Primary Examiner* — Amy Cohen Johnson
*Assistant Examiner* — Daniel Wicklund
(74) *Attorney, Agent, or Firm* — Volentine, Whitt & Francos, PLLC

(57) ABSTRACT

A wrist watch includes a wrist band attached to a device module, where sensors disposed on the wrist band and the device module sense wrist muscle movements made by a user and generate corresponding sense signals. The device module includes a main memory that stores a sensing application and a target application, a secondary memory that stores a reference input value, and a controller that executes the sensing application in conjunction with the execution of the target application, such that the sensing application generates a current input value in response to the corresponding sense signal, and compares the current input value with the reference input value to execute one function selected from among a plurality of functions defined for the target application.

20 Claims, 19 Drawing Sheets

(56) References Cited

U.S. PATENT DOCUMENTS

| | | | |
|---|---|---|---|
| 8,292,833 B2* | 10/2012 | Son | A61B 5/1126 |
| | | | 250/316.1 |
| 8,717,291 B2* | 5/2014 | Sun | G06F 3/017 |
| | | | 345/158 |
| 2012/0082013 A1 | 4/2012 | Yeung et al. | |
| 2014/0028546 A1* | 1/2014 | Jeon | G06F 3/014 |
| | | | 345/156 |
| 2014/0045547 A1 | 2/2014 | Singamsetty et al. | |
| 2014/0055352 A1 | 2/2014 | Davis et al. | |
| 2014/0143785 A1* | 5/2014 | Mistry | G06F 9/4893 |
| | | | 718/104 |
| 2015/0061842 A1* | 3/2015 | Yoon | G04G 21/04 |
| | | | 340/12.5 |
| 2015/0070270 A1* | 3/2015 | Bailey | A61B 5/0488 |
| | | | 345/156 |
| 2015/0084860 A1* | 3/2015 | Aleem | G06F 3/017 |
| | | | 345/156 |
| 2015/0085621 A1* | 3/2015 | Hong | G04G 21/00 |
| | | | 368/10 |
| 2015/0124566 A1* | 5/2015 | Lake | G04G 21/08 |
| | | | 368/10 |
| 2015/0185838 A1* | 7/2015 | Camacho-Perez | G06F 3/014 |
| | | | 345/156 |
| 2015/0277384 A1* | 10/2015 | Mankowski | G04G 21/04 |
| | | | 368/10 |
| 2015/0301606 A1* | 10/2015 | Andrei | G06F 3/017 |
| | | | 345/156 |
| 2016/0018984 A1* | 1/2016 | Choi | G06F 3/04883 |
| | | | 715/716 |
| 2016/0022210 A1* | 1/2016 | Nuovo | A61B 5/681 |
| | | | 600/301 |

FOREIGN PATENT DOCUMENTS

| | | |
|---|---|---|
| KR | 1020100074461 A | 7/2010 |
| KR | 1020130061777 A | 6/2013 |

* cited by examiner

FIG. 3A
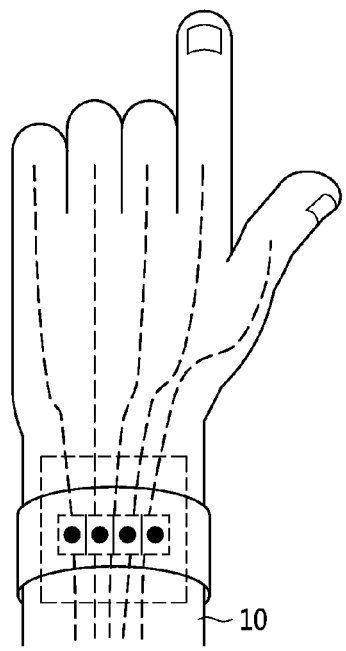
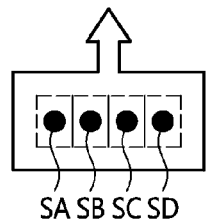
SA SB SC SD
FIG. 3B
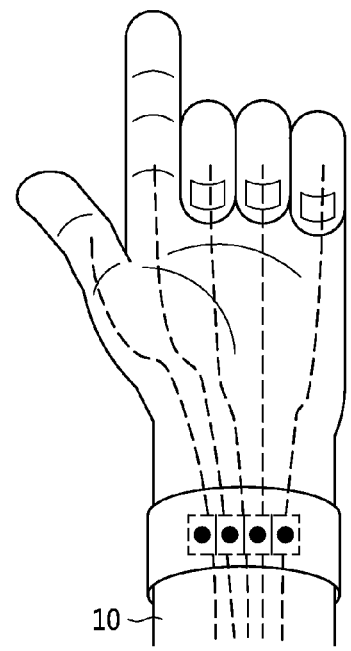
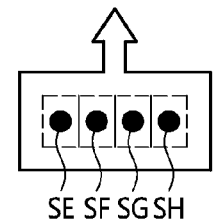
SE SF SG SH

FIG. 10

| User Gesture | Sensed Signals | Application ||||||
|---|---|---|---|---|---|---|---|
| | | OS | APP1 | APP2 | APP3 | APP4 | APP5 |
| GESTURE1 | SA1 SB1 SC1 SD1 SE1 SF1 SG1 SH1  T₁ time | F61 | F11 | F21 | F31 | - | F51 |
| GESTURE2 | SA2 SB2 SC2 SD2 SE2 SF2 SG2 SH2  T₁ time | F62 | F12 | - | F32 | F42 | F52 |
| GESTURE3 | SA3 SB3 SC3 SD3 SE3 SF3 SG3 SH3  T₁ time | F63 | - | F23 | F33 | F43 | F53 |

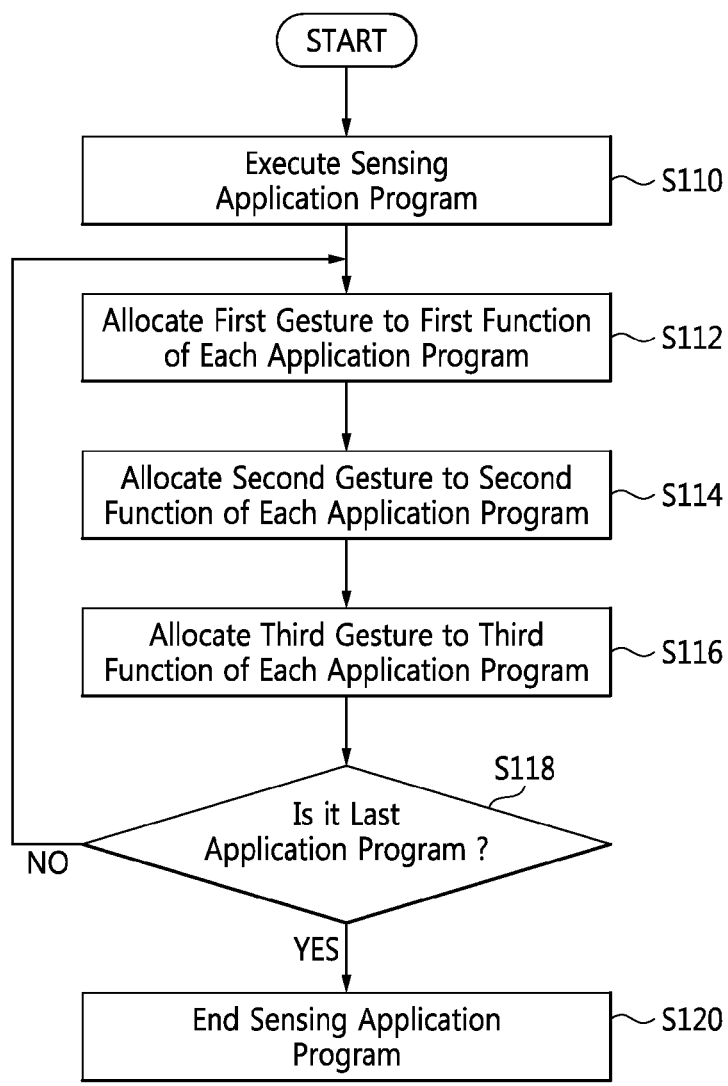

FIG. 16

Table 236-1

| OS | F61 | N61 | F62 | N62 | F63 | N63 |
|---|---|---|---|---|---|---|
| APP1 | F11 | N11 | F12 | N12 | - | - |
| APP2 | F21 | N21 | - | - | F23 | N23 |
| APP3 | F31 | N31 | F32 | N32 | F33 | N33 |
| APP4 | - | - | F42 | N42 | F43 | N43 |
| APP5 | F51 | N51 | F52 | N52 | F53 | N53 |

FIG. 17
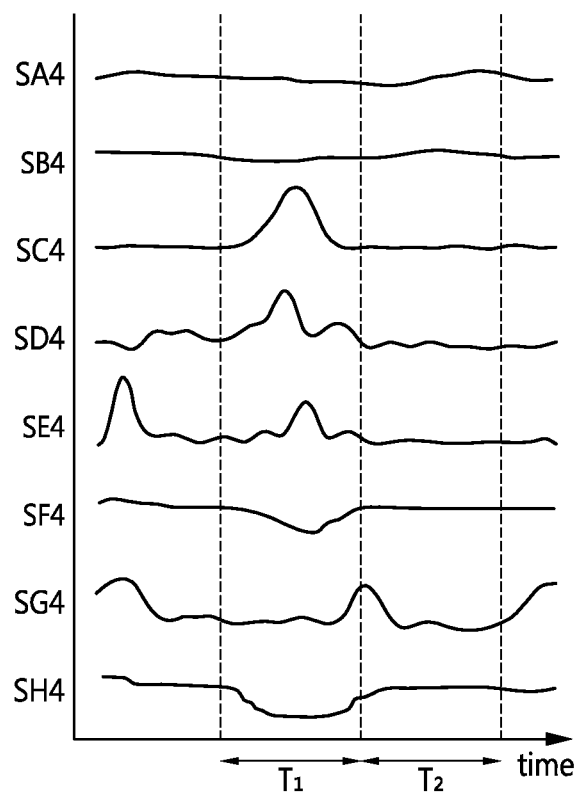
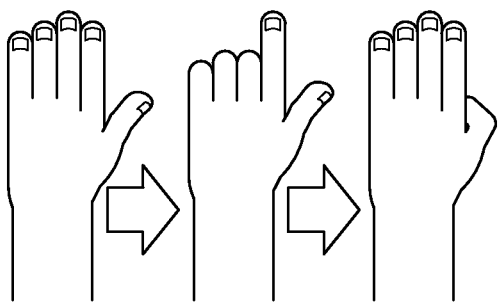

PROCESSOR PROCESSING SENSOR SIGNAL CORRESPONDING TO WRIST MUSCLE MOVEMENT AND DEVICES INCLUDING SAME

CROSS-REFERENCE TO RELATED APPLICATIONS

This application claims priority under 35 U.S.C. § 119(a) from Korean Patent Application No. 10-2014-0112870 filed on Aug. 28, 2014, the subject matter of which is hereby incorporated by reference in its entirety.

BACKGROUND

Embodiments of the inventive concept relate to an integrated circuit (IC), and more particularly to a processor, such as an application processor, that processes sensor signals corresponding to wrist muscle movement, and devices including same.

A smart watch includes a watch body (or device module) including a display, and a wrist band attaching the watch body to the wrist of a user.

User input may be provided to the watch body using a touch screen provided by the display, and a processor in the watch body may be used to control the smart watch operation in response to the user input. However, the introduction of user data usually requires the use of both of the user's hands—one to wear the smart watch and the other to actuate the touch screen.

SUMMARY

An object of the inventive concept is to provide a processor which can process user input corresponding to a movement of wrist muscles so that a user can instantly operate a smart watch without using his/her other hand.

An exemplary embodiment of the present inventive concepts is directed to a wrist watch, including a wrist band, a plurality of sensors which are formed in the wrist band, senses movements of wrist muscles of a user, and generate sense signals, and a device module which is connected to the wrist band and includes a display. The device module includes a first memory which stores an operating system (OS) and application programs, a second memory which stores reference input values, and a controller which executes the OS and the application programs. The controller executes a first application program among the application programs, compares a current input value corresponding to the sense signals with each of the reference input values, and executes one of functions of the first application program according to a result of the comparison.

The device module further includes a plurality of modules, and the controller executes the first application program in response to an interrupt signal output from one of the plurality of modules.

According to an exemplary embodiment, the controller executes the first application program which is running in a background in a foreground. According to another exemplary embodiment, the controller determines an execution frequency of each of the application programs and executes the first application program which has a highest execution frequency based on a result of the determination. According to still another exemplary embodiment, the controller executes the first application program according to a value set by a user.

The controller compares the current input value with from a reference input value which has a highest frequency of use among the reference input values. The first application may be one of an application supplying a position-based service and an application performing pairing with an external device. The first application may be the OS. The plurality of sensor may be electromyography (EMG) sensors.

An exemplary embodiment of the present inventive concepts is directed to an application processor, including a memory storing reference input values, and a controller executing an operating system (OS) and application programs. The controller executes a first application program among the application programs, generates a current input value based on sense signals received from a plurality of sensors, compares the current input value with each of the reference input values, and executes one of functions of the first application program according to a result of the comparison.

An exemplary embodiment of the present inventive concepts is directed to a system on chip (SoC), including a first memory storing an operating system (OS) and application programs, a second memory storing reference input values, and a controller executing the OS and the application programs. The controller executes a first application program among the application programs, generates a current input value based on sense signals received from a plurality of sensors, compares the current input value with each of the reference input values, and executes one of functions of the first application program according to a result of the comparison.

An exemplary embodiment of the present inventive concepts is directed to a method of operating a wrist watch, including executing, by a controller, an operating system (OS) and application programs in a background, executing, by the controller, a first application program among the application programs in a foreground, receiving, by the controller, sense signals corresponding to movements of wrist muscles of a user output from a plurality of sensors formed in a wrist band, and comparing, by the controller, a current input value corresponding to the sense signals with each of reference input values received from a memory, and executing one of functions of the first application program according to a result of the comparison.

The executing the first application program in the foreground includes receiving, by the controller, an interrupt signal output from one of a plurality of modules embodied in the wrist watch, and executing, by the controller, the first application program in the foreground in response to the interrupt signal.

The executing the first application program in the foreground includes determining an execution frequency of each of the application programs and executing the first application program which has a highest execution frequency in the foreground. The controller executes the first application program in the foreground according to a value set by a user.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3, inclusive of FIGS. 3A and 3B, shows positions of sensors when wearing the wrist watch according to an exemplary embodiment of the inventive concept;

FIG. 10 shows an exemplary embodiment of each function defined for each application program;

FIG. 11 is a flowchart for describing a method of setting each function for each application program;

FIG. 16 shows a table that may be sued to store a frequency of use measurement for each function defined for multiple applications;

FIG. 17 shows a waveform diagram of sense signals on sequential gestures of a user.

DETAILED DESCRIPTION

Certain embodiments of the inventive concept will be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the invention to those skilled in the art. Throughout the drawings and written description like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
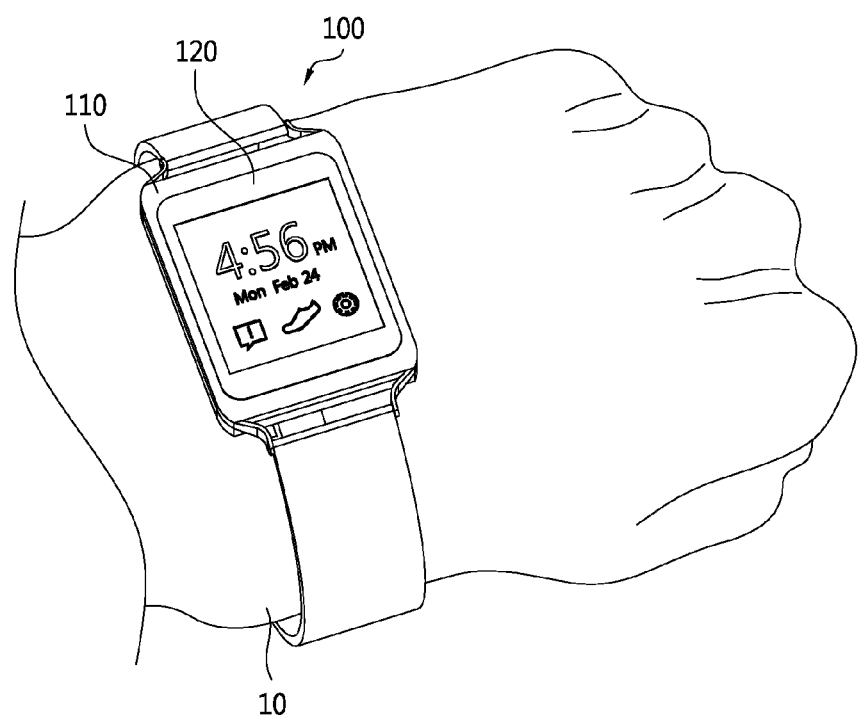
FIG. 1 is a perspective view of a user wearing a wrist watch according to an embodiment of the inventive concept.

Figure (FIG. 1 is a perspective view illustrating a wrist watch 100 being worn around the wrist 10 of a user according to an embodiment of the inventive concept. The wrist watch 100 may be a so-called "smart watch" capable of executing one or more applications in response to user inputs. In this context, the term "application" denotes a software component (e.g., a program or set of programs) that controls one or more hardware components of the wrist watch to effect one or more functions. Those skilled in the art will recognize that the wrist watch example illustrated in FIG. 1 is merely a selected example of many different "devices"that may incorporate the subject matter described hereafter.

Physically, the wrist watch 100 includes a wrist band 110 and a device module 120. The wrist band 110 secures the wrist watch 100 around the user's wrist 10 and may alternately be referred to as a watch strap or an attachment band. The wrist band 110 may have a continuous belt structure or a multiple segment structure allowing flexible or elastic wear-ability.

In certain embodiments of the inventive concept, the wrist band 110 will include one or more wrist movement "sensor(s)". For example, respective sensors may be used to sense movement of particular muscles and/or tendons (hereafter, singularly or collectively referred to as "muscles") traversing the user's wrist, and to generate one or more corresponding wrist movement "sense signals". Such sense signals may initially be interpreted by computational or logic components of the wrist watch 100 as "reference input value(s)". This threshold interpretation of sense signals may be accomplished during a set-up operation performed by the wrist watch 100. Following the set-up operation and during normal use of the wrist watch 100 by the user, the sense signals generated by the sensors will be interpreted as "current input value(s)".

In this regard, the wrist watch 100 may include one or more sensor types, such as electromyography (EMG) sensors or pressure sensors capable of sensing (or detecting) the particular movement of various muscles in the user's wrist.

The device module 120 may be embodied in one of many different physical forms including square-shaped, oval-shaped, or circular-shaped housing. Exemplary software, hardware and functional components of the device module 120, as well as an exemplary mode of operation, will be described with reference to FIG. 4A, hereafter.

Figure 2A:
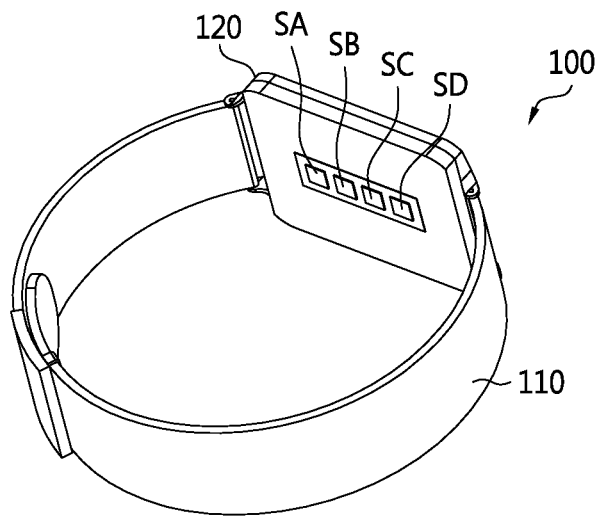
FIG. 2, inclusive of FIGS. 2A and 2B, illustrates sensor embodied in a wrist band of FIG. 1.
Figure 2B:
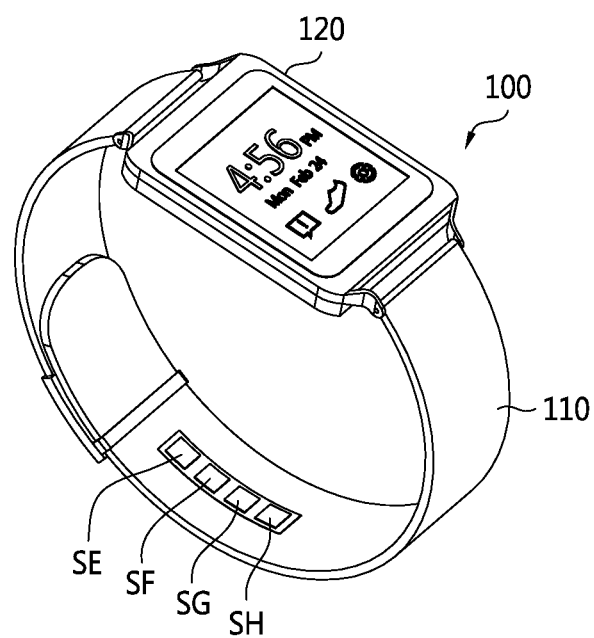

FIG. 2, inclusive of FIGS. 2A and 2B, further illustrates in different perspective views the provision of sensors (e.g., SA, SB, SC and SD and/or SE, SF, SG and SH) in the wrist band 110 or device module 120 of the wrist watch 100 of FIG. 1. Referring to FIG. 2A, a first set of sensors ("first sensors") SA, SB, SC and SD are provided on an inner surface of the device module 120. In this context, the term "inner surface" refers to a surface of a device module (or a wrist band) making physical contact with some portion of the user's wrist when the wrist watch 100 is normally worn by the user. In contrast, the term "outer surface" refers to a surface of a device module (or a wrist band) not making physical contact with the user's wrist when the wrist watch 100 is normally worn by the user.

Referring to FIG. 2B, a second set of sensors ("second sensors") SE, SF, SG, and SH is provided in an inner surface of the wrist band opposite to the first set of sensors SA, SB, SC, and SD when the wrist watch is normally worn by the user on a wrist.

FIG. 3, inclusive of FIGS. 3A and 3B, further illustrates in one example the positioning of first sensors and second sensors on the wrist watch 100 of FIGS. 1 and 2 according to an embodiment of the inventive concept. As shown in FIG. 3A, the first sensors SA, SB, SC, and SD are provided to sense wrist muscle movements apparent at a first (e.g., an upper) portion of the user's wrist 10, and generate corresponding "first sense signals". As shown in FIG. 3B, second sensors SE, SF, SG, and SH are provided to sense wrist muscle movements apparent at a second (e.g., a lower) portion of the user's wrist 10, and generate corresponding "second sense signals". For convenience of description, a total of only eight sensors (e.g., SA through SH) described in the illustrated embodiments, however those skilled in the art will understand that a greater or lesser number of sensors, variously arranged, may be used in other embodiments of the inventive concept.

Figure 4A:
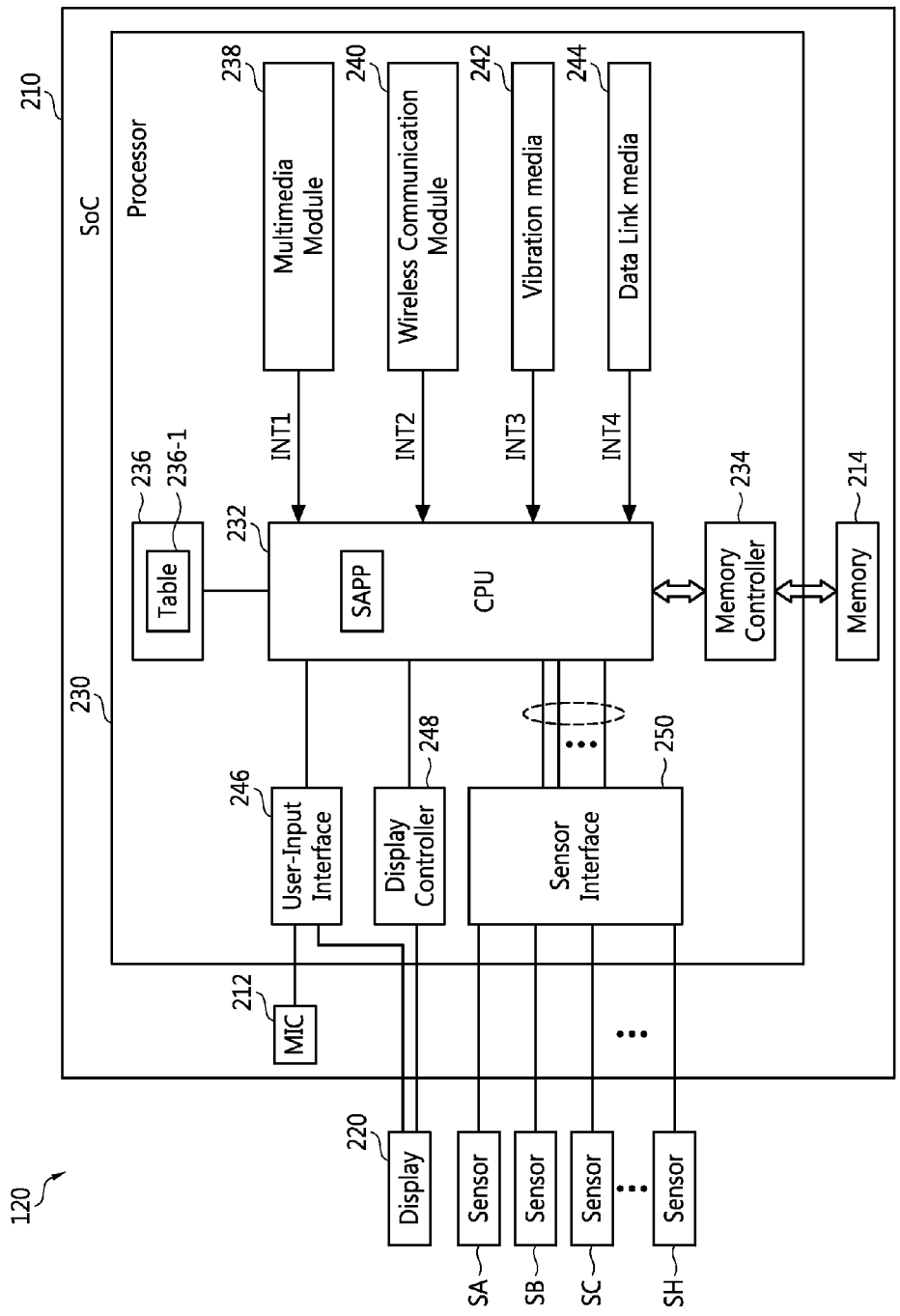
FIG. 4A is a block diagram of the device module shown in FIG. 1.

FIG. 4A is a block diagram further illustrating in one example the device module 120 of FIG. 1. Here, the device module 120 may be embodied within a watch body or housing having different shapes and sizes. The device module 120 of FIG. 4A generally includes a system on chip (SoC) 210 and a display 220.

As will be appreciated by those skilled in the art the SoC 210 may be embodied as a single package including one or more semiconductor and/or electronic devices. Here, the SoC 210 is assumed to generally include a microphone 212, a main memory 214, and a processor 230. This is a fairly basic example of a SoC that may be used in embodiments of the inventive concept, and those skilled in the art will understand that additional and/or alternate components may be provided in the SoC, along with the processor 230.

The microphone 212 is configured to communicate an electrical signal to the processor 230 via a user-input interface 246 and in response to received audio information (e.g., the user's voice). The main memory 214 is operatively connected to the processor 230 and in the illustrated example of FIG. 4A is assume to store at least one operating system (OS) and multiple applications that may be executed by the SoC 210 using one or more software resources provided by the OS. The main memory 214 may include volatile memory and/or non-volatile memory, and may be provided as a fixed memory element and/or a removable memory element. In this regard, the main memory 214 may be embodied as a dynamic random access memory (DRAM), a static random access memory (SRAM), a read-only memory (ROM), an erasable programmable read-only memory (EPROM), or an erasable electric programmable read-only memory (EEPROM).

The processor 230 of FIG. 4A includes a central processing unit (CPU) 232, a memory controller 234, a secondary memory 236, one or more modules 238, 240, 242, and 244, a user-input interface 246, a display controller 248, and a sensor interface 250. The processor 230 may be embodied as one or more integrated circuit(s), one or more SoC, an application processor, a mobile application processor, etc. The processor 230 may be used to control the operation and inter-operation of the microphone 212 and main memory 214.

The CPU 232 may be sued to perform various controller function(s) and may include one or more processing cores. The CPU 232 may be used to execute (or run) the OS, as well as one or more application(s), where the OS and/or an application, wholly or in part, may be run in the processing background or processing foreground of the CPU 232.

That is, the CPU 232 may read and execute the OS and/or application from the main memory 214 using the memory controller 234. The CPU 232 may also be used to store (or write) one or more applications, together with related data as needed, to the main memory 214 using the memory controller 234. Hereafter, one or more application(s) that interrupt and/or respond to sensor signals provided by the wrist watch 100 of FIGS. 1 and 2 in response to detected wrist muscle movements will be referred to as "sensing application" or "SAPP". A sensing application may be stored in the main memory 214 in certain embodiments of the inventive concept.

In this regard one or more user inputs (e.g., input(s) provided via the interactive display 220) may be interrupted and/or processed in relation to detected wrist muscle movements. Such interruption and processing may be accomplished using the hardware resources provided by CPU 232, and/or the software resource provided by the sensing application SAPP. In the illustrated example of FIG. 4A, a secondary memory 236 may be used to store reference input values and/or current input values (e.g.,) in one or more tables 236-1. Those skilled in the art will recognize that the secondary memory 236 may be variously configured from volatile and/or nonvolatile memory, as a register memory or cache memory, and may be physically separate or combined with the main memory 214. Hence, the main memory 214 and secondary memory 236 may be understood as being at least functionally distinct in relation to the storage of OS and sensing application on one hand and the storage of reference input values and current input values on the other hand.

Figure 4B:
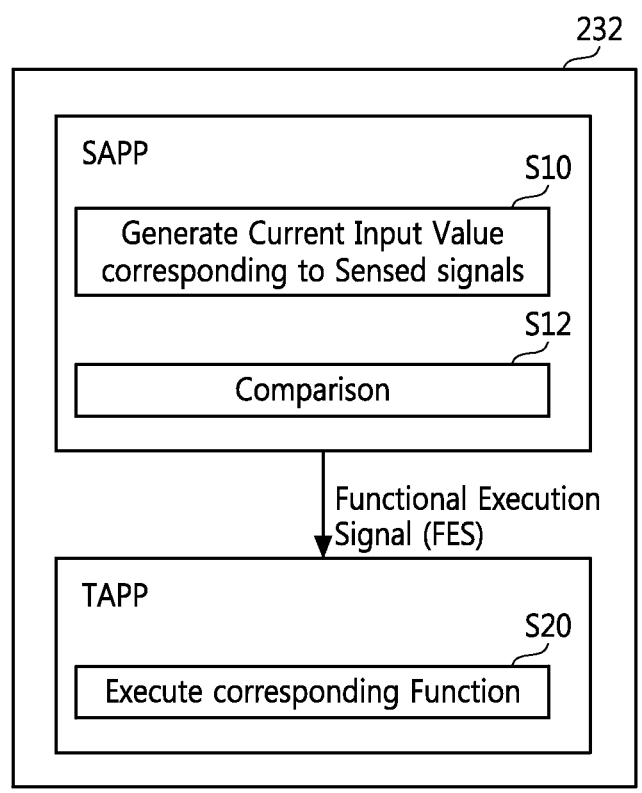
FIG. 4B is a conceptual diagram describing an operation of a sensing application program and an operation of a target application which are executed in the device module of FIG. 1.

FIG. 4B is a conceptual diagram further illustrating in one example the execution of a sensing application (SAPP) in relation to a target application (TAPP) running on the SoC 230 of the device module 120 in FIGS. 1, 2 and 4A. Referring to FIGS. 1, 2, 4A and 4B, the CPU 232 may be used to generate and store current input value(s) in the secondary memory 236 in response to executing the sensing application. Thereafter, the current input value(s) may be read and compared to certain reference input values associated with the execution of the sensing application. Here, the reference input values may be previously stored in the main memory 214 or secondary memory 236 or derived from data obtained during a set-up operation for the sensing application. For example, the CPU 232 may perform a comparison operation between current input values and reference input values stored in the secondary memory 236.

Hence, the sensing application executed by the CPU 232 may generate current input value(s) corresponding to sense signals communicated from the sensors SA through SH (S10). The sensing application may then read reference input values stored in the secondary memory 236 in response to the sense signals and then compare respective current input value(s) with reference input value(s) in order to generate a functional execution signal (FES) that is communicated to the target application (TAPP) being executed according to the comparison results (S12). Thereafter, the target application may perform some function corresponding to the nature of the functional execution signal (S20).

In this regard, the target application (TAPP) may operate in conjunction with one or more modules functionally or computationally responsive to the functional execution signal. Exemplary modules include a multimedia module 238, a wireless communication module 240, a vibration module 242, and a data link module 244, as illustrated in FIG. 4A. Further, the target application (TAPP) may invoke or "call" the sensing application (SAPP) during its execution to obtain accurate current input values using the sensors provided by the wrist watch 100. Still further, it will be understood that one or more of the modules described above may be embodied using the processor 230 or embodied external to the processor 230.

The multimedia module 238 may include a multimedia player such as a CODEC or a multi-function CODEC (MFC). The wireless communication module 240 may include a mobile/cellular transceiver and/or a wireless network interface. The wireless network interface may include a wireless internet interface, a Bluetooth interface, a Wi-Fi interface, and/or a near field communication (NFC) interface.

The vibration module 242 may generate a mechanical vibration under the control of the CPU 232. The data link module 244 may include a universal serial bus (USB) port, an external memory port, and/or other appropriate ports. The user-input interface 246 may include a touch screen, a touch pad, and/or a keypad. The display controller 248 may communicate display data or a user interface (UI) to the display 220 under the control of the CPU 232. Accordingly, the display 220 may be used to display generated display data, such as the type used to provide a user interface.

The user may cause execution of the OS, target application and/or the sensing application via user inputs to the user-input interface 246, as embodied by a touch screen, touch screen panel, touch pad, etc. provided via the display 220. According to certain embodiments of the inventive concept, the user-input interface 246 and display 220 may be embodied as one display module. The display 220 may be embodied as a thin-film transistor-liquid crystal display (TFT-LCD), a light-emitting diode (LED) display, an organic LED (OLED) display, an active-matrix OLED (AMOLED) display, or a flexible display.

The sensor interface 250 may be used to communicate electrical signals (e.g., analog signals and/or digital signals) corresponding to the sense signals provided by the sensors (e.g., SA through SH) to the CPU 232. For example, the sensor interface 250 may be used to perform an analog-to-digital conversion of analog signals received from the sensors. In this regard, certain embodiments of the inventive concept described hereafter will assumed the use of sensors providing analog sensor signals. However, other embodiments of the inventive concept may incorporate sensors providing digital signals.

Figure 5A:
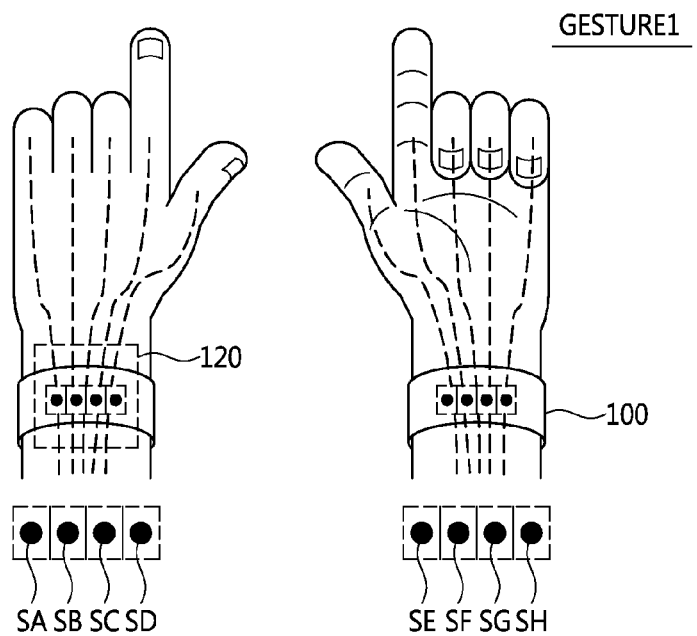
FIG. 5, inclusive of FIGS. 5A and 5B, shows a first gesture of a user and waveforms of first sense signals.
Figure 5B:
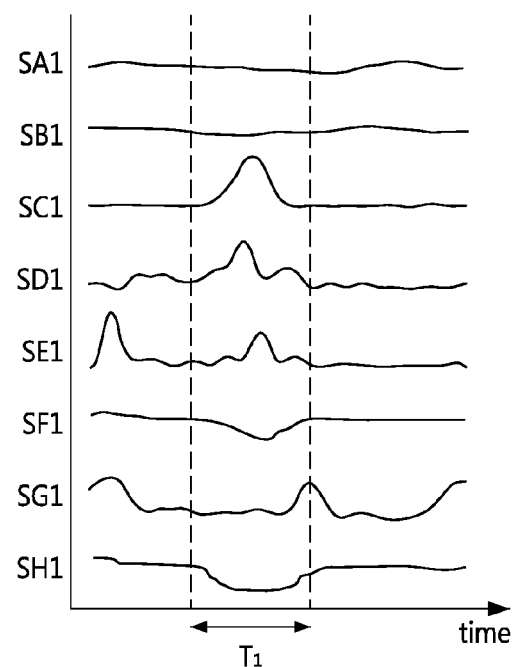

FIG. 5, inclusive of FIGS. 5A and 5B, illustrates the making of a first gesture (GESTURE1) by a user wearing the wrist watch 100 of FIGS. 1, 2, 3 and 4, as well as corresponding sense signal waveforms. Here, when the first gesture is made in FIG. 5A by selected finger movements—which cause corresponding wrist muscle movements—a waveform diagram for the first sense signals SA1 to SH1 provided by the sensors SA through SH is shown in FIG. 5B. The respective waveforms SA1 to SH1 detected by the sensors SA through SH shown in FIG. 5B may be used to generate (or define) a current input value during normal operation of the wrist watch 100 or to generate a reference input value during a set-up operation for the wrist watch 100. That is, the CPU 232 running the sensing application SAPP may generate a current input value (or reference input value) in response to the sensor signals detected during a sampling interval T1.

Figure 6A:
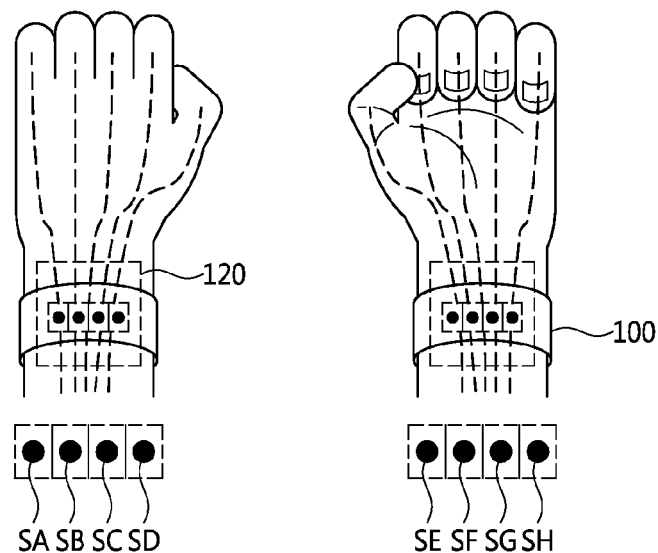
FIG. 6, inclusive of FIGS. 6A and 6B, shows a second gesture of a user and waveforms of second sense signals.
Figure 6B:
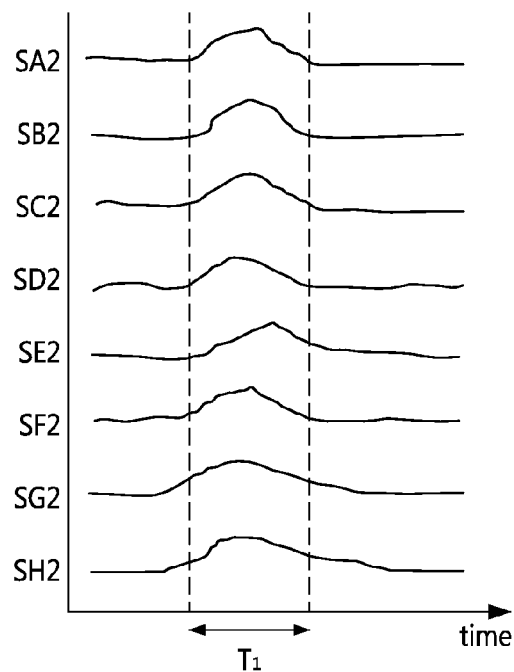
Figure 7A:
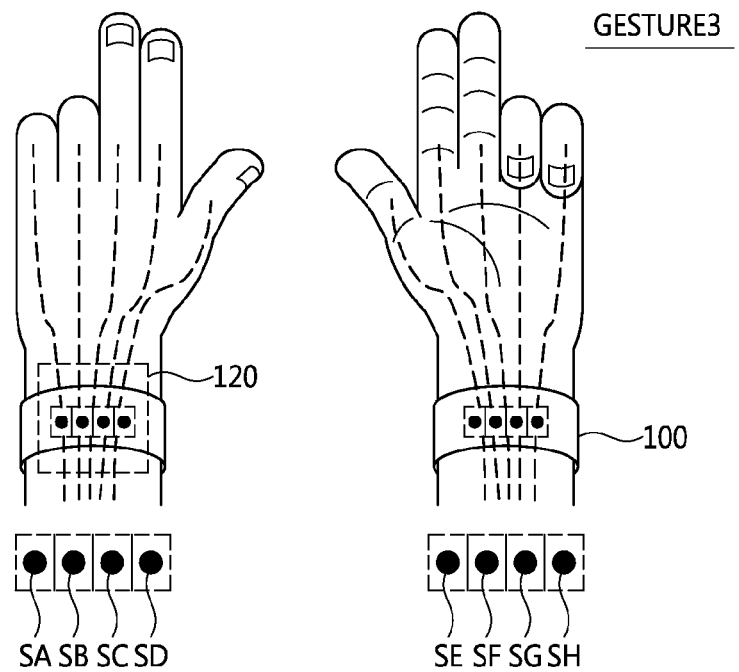
FIG. 7, inclusive of FIGS. 7A and 7B, show a third gesture of a user and waveforms of third sense signals.
Figure 7B:
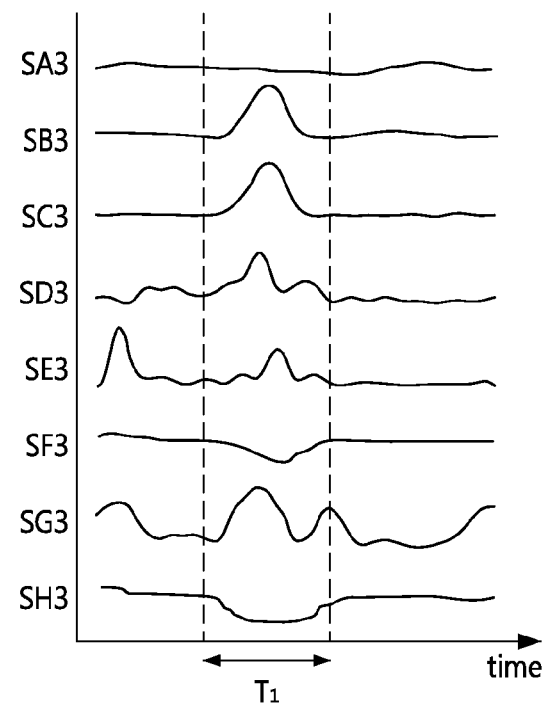

FIG. 6, inclusive of FIGS. 6A and 6B, illustrates the making of a second gesture (GESTURE2) by a user wearing the wrist watch 100 of FIGS, 1, 2, 3 and 4, as well as corresponding sense signal waveforms, and FIG. 7, inclusive of FIGS. 7A and 7B, illustrates the making of a third gesture (GESTURE3) by a user wearing the wrist watch 100 of FIGS, 1, 2, 3 and 4, as well as corresponding sense signal waveforms. Here, when the second (or third) gesture is made by selected finger movements—which cause corresponding wrist muscle movements—a waveform diagram for the second (or third) sense signals SA2 to SH2 (SA3 to SH3) provided by the sensors SA through SH is respectively shown in FIGS. 6B and 7B. The respective waveforms of SA2 to SH2 (SA3 to SH3) detected by sensors SA through SH may be used to generate (or define) a current input value or a reference input value. That is, the CPU 232 running the sensing application SAPP may generate a current input value (or reference input value) in response to the sensor signals detected during a sampling interval T1.

As shown in FIGS. 5, 6 and 7, first sense signals, second sense signals, or third sense signals are uniquely detected using the sensors SA through SH and may accordingly be communicated to the CPU 232 via the sensor interface 250.

Figure 8A:
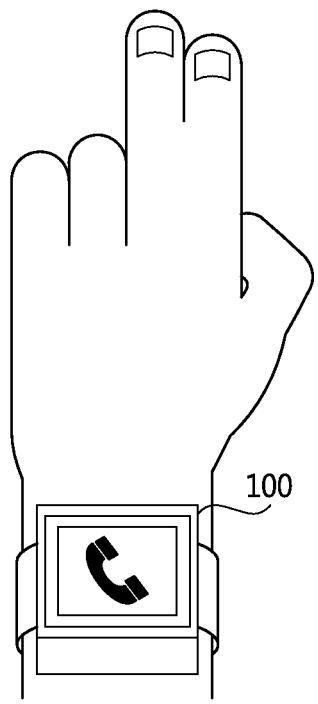
FIG. 8, inclusive of FIGS. 8A and 8B, shows exemplary embodiments of functions defined by a first user.
Figure 8B:
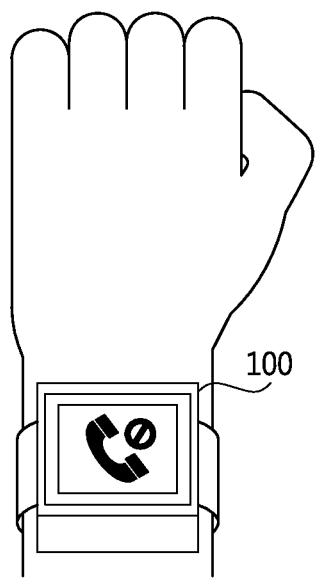

FIG. 8, inclusive of FIGS. 8A and 8B, illustrates the actuation of different wrist watch functions as the consequence of making different hand gestures. Here, as an example, FIG. 8A illustrates a first gesture that actuates through first resulting wrist muscle movements a first function (e.g., an incoming call acceptance). In this example, a phone application running of the wrist watch 100 is assumed as a target application (TAPP) capable of calling upon the sensing application (SAPP) to selectively actuate different functions enabled by the target application. Thus, FIG. 8B illustrates a second gesture that actuates through second resulting wrist muscle movements a second function (e.g., an incoming call rejection).

Figure 9A:
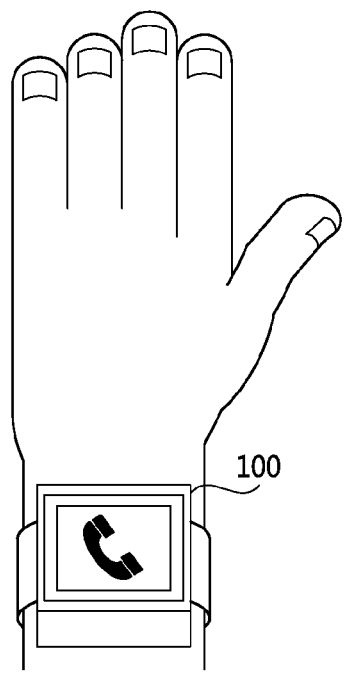
FIG. 9, inclusive of FIGS. 9A and 9B, shows exemplary embodiments of functions defined by a second user.
Figure 9B:
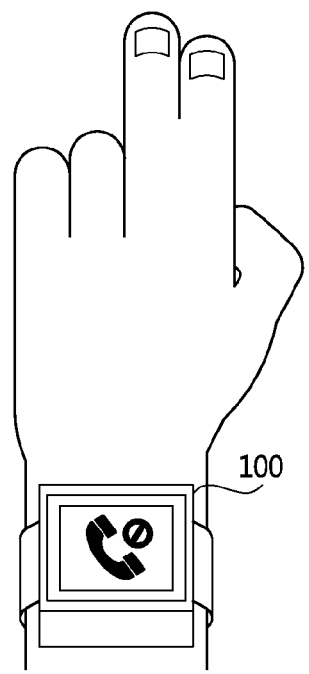

FIG. 9, inclusive of FIGS. 9A and 9B, illustrates an alternate set of finger gestures that may be used to selectively actuate different functions (e.g., incoming call acceptance or rejection) enabled by a target (telephone) application (TAPP) capable of calling upon the sensing application (SAPP).

With respect to the foregoing examples, the range of different finger gestures need not be too extensive where multiple target applications are executable on the wrist watch 100 are capable of calling the sensing application.

FIG. 10 is a table correlating a different finger gestures that may be used to select among different functions defined by different target applications, each capable of operating in response to a sensing application. In this regard, FIG. 11 summarizes a method of operating the wrist watch 100 of FIGS. 1, 2 and 4 under the assumptions described by the table of FIG. 10. Referring to FIGS. 1, 2, 4, 10 and 11, a user of the wrist watch 100 is assumed to cause execution of a sensing application program using the user input interface 246 or display 220 (S110). As a result, the sensing application program starts a process of allocating (or defining) each one of the given gestures to a particular function of each target application or operating system (OS). According to embodiments of the inventive concept, one of the target applications may be the operating system (OS).

Thus, the user may allocate a first gesture (GESTURE1) by making the gesture, having the sensors SA through SH sense the corresponding wrist muscle movement, and then communicating the resulting first sense signals SA1 to SH1 to the sensor interface 250. The sensor interface 250 may then communicate first digital signals corresponding to the first sense signals SA1 to SH1 to the CPU 232.

The user may then allocate the first gesture to a first function F61 of the OS using the sensing application program SAPP (S112). For example, the first function F61 may be "starting update installation". The user may also allocate first gesture to a first function F11 of a first target application APP1 using the sensing application program SAPP (S112). For example, the first target application APP1 may be the phone application program and the first function F11 may be an "incoming call acceptance".

In similar vein, the user may allocate the first gesture to a first function F21 of a second target application APP2 using the sensing application program SAPP (S112). For example, the second application program APP2 may be an "e-mail application", and the first function F21 may be "viewing mail". The user may allocate or define the first gesture to a first function F31 of a third target application APP3 (S112). For example, the third application program APP3 may be a "web browser application", and the first function F31 may be "start browsing".

However, the user may chose not to allocate the first gesture to a first function of a fourth target application APP4 using the sensing application program SAPP. And the user may allocate the first gesture to a first function F51 of a fifth target application APP5 using the sensing application program SAPP (S112). For example, the fifth application program APP5 may be a "multimedia player application", and the first function F51 may be "start playing".

Following these user definitions, the CPU 232 may map first digital signals corresponding to the first gesture onto the first functions F11, F21, F31, F51, and F61 allocated to each of the application programs APP1, APP2, APP3, and APP5 as well as the OS, and store the resulting mapping in the main memory 214 or the secondary memory 236. In certain embodiments of the inventive concept, an initial definition of gesture(s) may be performed as part of a wrist watch (or target application) set-up operation. That is, the initial definition of first gesture-related digital signals may establish reference input value(s).

In the illustrated example of FIGS. 10 and 11, the user may continue to allocate gestures amongst target application functions and operating systems until all target applications and operating systems are defined in relation to all desired gestures (e.g., S112, S114 and S116).

Once the user has allocated for each desired function of each desired target application and operating systems program (S118), the sensing application SAPP is ended (S120).

Figure 12C:
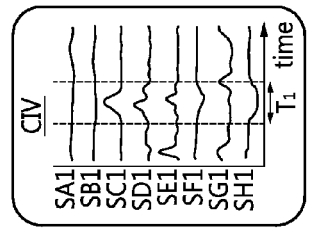
FIG. 12, inclusive of FIGS. 12A, 12B, 12C, 12D and 12E, is a conceptual diagram describing operation of the wrist watch shown in FIG. 1.

FIG. 12, inclusive of FIGS. 12A, 12B, 12C, 12D and 12E, is a conceptual diagram illustrating the operation of the wrist watch 100 of FIG. 1. FIG. 13 is a flowchart summarizing in one embodiment the operation of the wrist watch 100 of FIG. 1. Operation of the wrist watch 100 of FIGS. 12 and 13 assumes the use of an operating system and target application (e.g., a telephone application) capable of calling upon a sensing application according to certain embodiments of the inventive concept.

Various target application, like the telephone application, as well as an OS and the sending application, will normally operate in the background of the wrist watch 100. When a phone call is received by the wireless communication module 240, the wireless communication module 240 is assumed to provide one or more interrupt signal(s) to the CPU 232 and/or the sensing application (S210). As shown in FIG. 12A, the OS running in the background of the CPU 232 or the sensing application program running in the back ground causes execution of the telephone application in the foreground upon receiving the interrupt signal (S212).

Figure 12B:
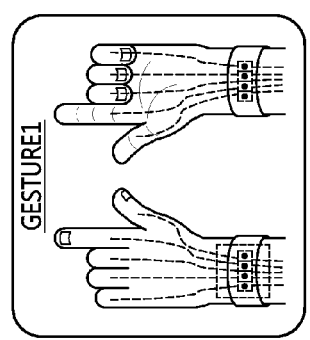
Figure 12A:
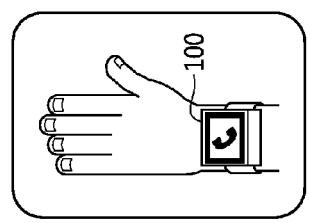
Figure 12D:
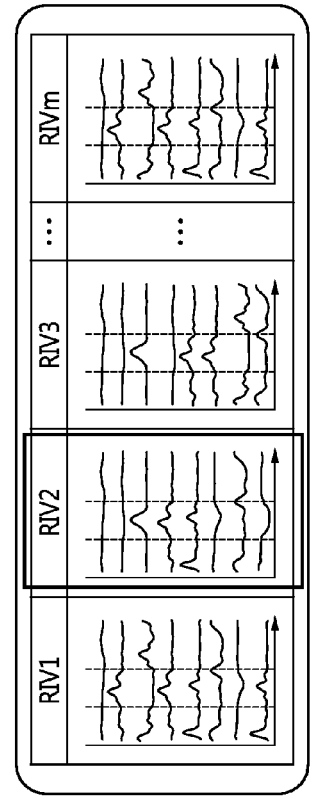
Figure 13:
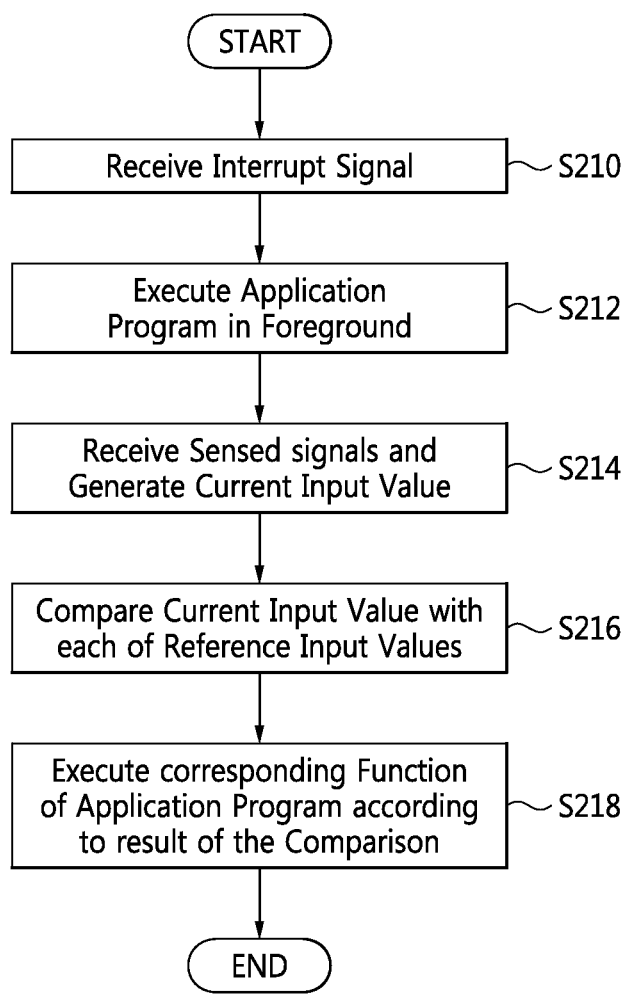
FIG. 13 is a flowchart describing an exemplary embodiment of the operation of the wrist watch shown in FIG. 1.

As shown in FIG. 12B, a user wearing the wrist watch 100 upon having the telephone application executed (i.e., upon receiving some application initiation indication via (e.g.,) the display) may make the first gesture (GESTURE1) so as allow reception of the incoming call. Accordingly, the wrist muscle movements associated with the first gesture are sensed.

As shown in FIG. 12C, the sensors SA to SH sense the wrist muscle movements and generate corresponding sense signals SA1 to SH1. The sense interface 250 communicates digital signals corresponding to the sense signals SA1 to SH1 to the CPU 232. That is, the CPU 232 or the sensing application program receive first digital signals corresponding to the sense signals SA1 to SH1 or the sense signals SA1 to SH1, and generate current input value(s) (CIV) (S214).

The CPU 232 and/or the sensing application program read the table 236-1 of the secondary memory 236 storing reference input values and compare the current input value(s) with respective reference input value(s) (RIV1 to RIVm) stored in the table 236-1 when the current input value is generated (S216).

Figure 12E:
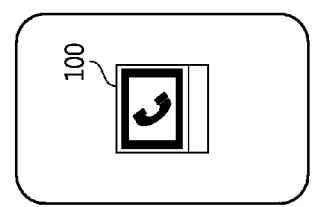

As a result of the comparison, when the current input value(s) are in accordance with a second reference input value (RIV2) defined in relation to a "call reception" function, the CPU 232 and/or sensing application program cause execution of the first function F11 among functions performed by the telephone application, now operating in the foreground of the wrist watch 100, as shown in FIG. 12E (S218). That is, the user may enable reception of the incoming phone call, among other possible functions, using the appropriate gesture. For example, a functional execution signal FES occurring when the current input value(s) are substantially the same as second reference input value(s) previously defined as the "call reception" function is generated when the user wants to performs the first function F11.

When the multimedia module 238 is executed according to another exemplary embodiment, the multimedia module 238 may generate a first interrupt signal INT1. Accordingly, the CPU 232 or the sensing application program SAPP may execute a target application (e.g., multimedia player application program), which is related to an execution of the multimedia module 238 and is executed in a background, in a foreground.

When the vibration module 242 is executed according to still another exemplary embodiment, the vibration module 242 may generate a third interrupt signal INT3. Therefore, the CPU 232 or the sensing application program SAPP may execute a target application (e.g., a phone application program, a text message service application program, an alarm application program, or an SNS application program), which is related to an execution of the vibration module 242 and is executed in a back ground, in a foreground.

When the data link module 244 is executed according to still another exemplary embodiment, the data link module 244 may generate a fourth interrupt signal INT4. Therefore, the CPU 232 or the sensing application program SAPP may execute a target application, which is related to an execution of the data link module 244 and is executed in a background, in a foreground.

The CPU 232 or the sensing application program SAPP may execute a function corresponding to a current input value among functions of the target application executed in a foreground. In addition, when the second interrupt signal INT2 is generated while a user performs a web-surfing using a web browser application program, the phone application program is executed at a foreground. Accordingly, the CPU 232 or the sensing application program SAPP may execute S214 to S218.

Figure 14:
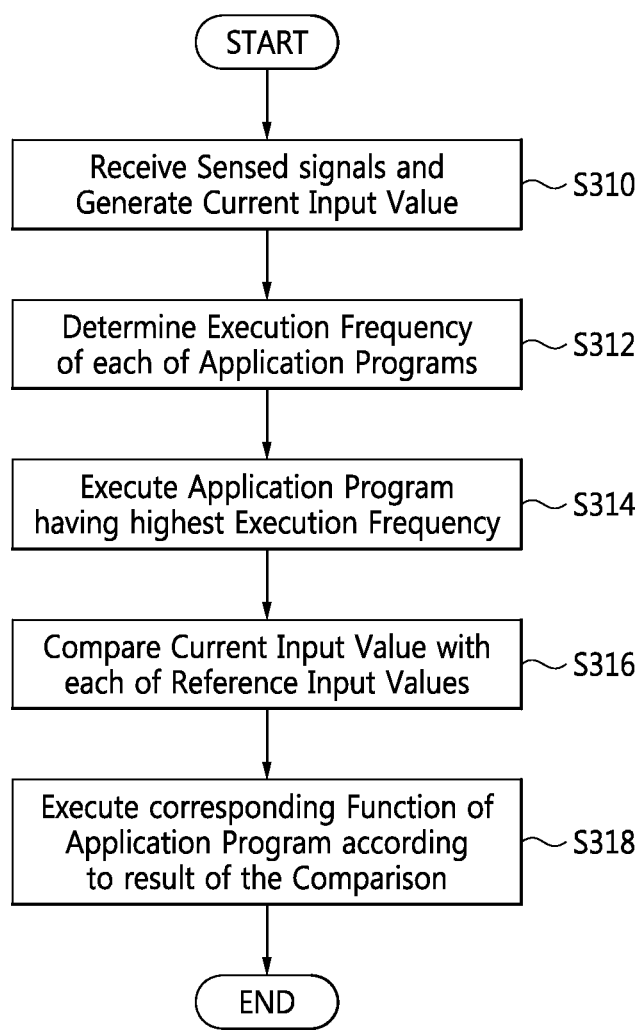
FIG. 14 is a flowchart describing another exemplary embodiment of the operation of the wrist watch shown in FIG. 1.

FIG. 14 is a flowchart summarizing another embodiment of the inventive concept that operates the wrist watch 100 of FIG. 1. The table 236-1 of FIG. 4A is assumed to store an execution frequency of each application. When the wrist watch 100 is in an idle state, a user performs a specific gesture with associated wrist muscle movement.

The sensors SA to SH will sense the wrist muscle movements and generate corresponding sense signals. The sensing interface 250 may then communicate digital signals corresponding to the sense signals to the CPU 232. That is, the CPU 232 and/or the sensing application program may receive the sense signals or digital signals corresponding to the sense signals, and generate a current input value (S310).

When the current input value is generated, the CPU 232 or the sensing application program SAPP may read the table 236-1 which stores reference input values and execution frequencies of applications, determine each execution frequency of the application programs (S312), select an application program which has a highest execution frequency among the application programs as a target application, and execute a selected target application in a foreground (S314). The CPU 232 or the sensing application program SAPP may compare the current input value with each of the reference input values stored in the table 236-1 (S316).

As a result of the comparison, when a reference input value which accords with the current input value is selected, the CPU 232 or the sensing application program SAPP may execute a function corresponding to the input value among functions of a target application operating in a foreground (S318).

Figure 15:
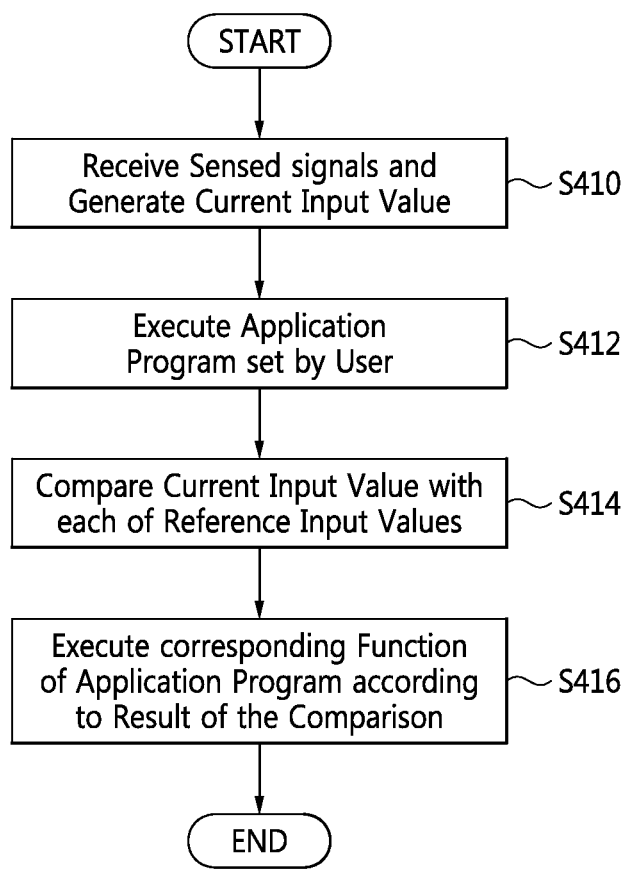
FIG. 15 is a flowchart describing still another exemplary embodiment of the operation of the wrist watch shown in FIG. 1.

FIG. 15 is a flowchart further summarizing another embodiment of the inventive concept in relation to the wrist watch 100 of FIG. 1. When the wrist watch 100 is in the idle state, the table 236-1 is assumed to store information associated with a target application (e.g., telephone application) to be executed as a default application.

When the wrist watch 100 is in the idle state, a user performs a specific gesture and corresponding wrist muscle movement occur.

The sensors SA to SH may sense the movements of wrist muscles, and generate sense signals corresponding to a result of the sensing. The sense interface 250 may transmit digital signals corresponding to the sense signals to the CPU 232. That is, the CPU 232 or the sensing application program SAPP may receive the sense signals or digital signals corresponding to the sense signals, and generate a current input value (S410).

When the current input value is generated, the CPU 232 or the sensing application program SAPP may read the table 236-1 which stores reference input values and information on a target application to be executed as a default, and execute the target application (e.g., phone application program) among application programs in a foreground according to the information stored in the table 236-1 (S412). The CPU 232 or the sensing application program SAPP may compare the current input value with each of the reference input values stored in the table 236-1 (S414).

As a result of the comparison, when a reference input value which accords with the current input value is selected, the CPU 232 or the sensing application program SAPP may execute a function (e.g., phone dial display) corresponding to the input value among functions of the target application (e.g., phone application program) operating in a foreground (S416).

FIG. 16 shows an exemplary embodiment of a table which includes a frequency of use of each function defined for each application program. Referring to FIG. 16, the table 236-1 may store execution frequencies N11 to N63 for each function of each application program.

When comparing a current input value with each of reference input values stored in the table 236-1, the CPU 232 or the sensing application program may compare the current input value with from a reference input value which has a highest frequency of use. For example, in a case of an OS, when a frequency of use N63 of a third function F63 is a highest and a frequency of use N62 of a second function F62 is a lowest, the CPU 232 or the sensing application program SAPP may firstly compare the current input value with a reference input value corresponding to the third function F63, and lastly compare the current input value with a reference input value corresponding to the second function N62. Accordingly, time for comparison can be reduced.

When a user uses a specific application program, the CPU 232 or the sensing application program SAPP may compare the current input value with from a reference input value which has a highest frequency of use. The specific application program may be an application program (e.g., a GPS-based application program) which supplies a position-based service, or an application program paired with a specific device (e.g., a door lock or an automobile).

FIG. 17 shows a waveform diagram of sense signals for sequential gestures of a user. Referring to FIG. 17, a user can define each function of each application program using sequential gestures. Each input value is sampled during a first sampling interval T1 and a second sampling interval T2.

Figure 18:
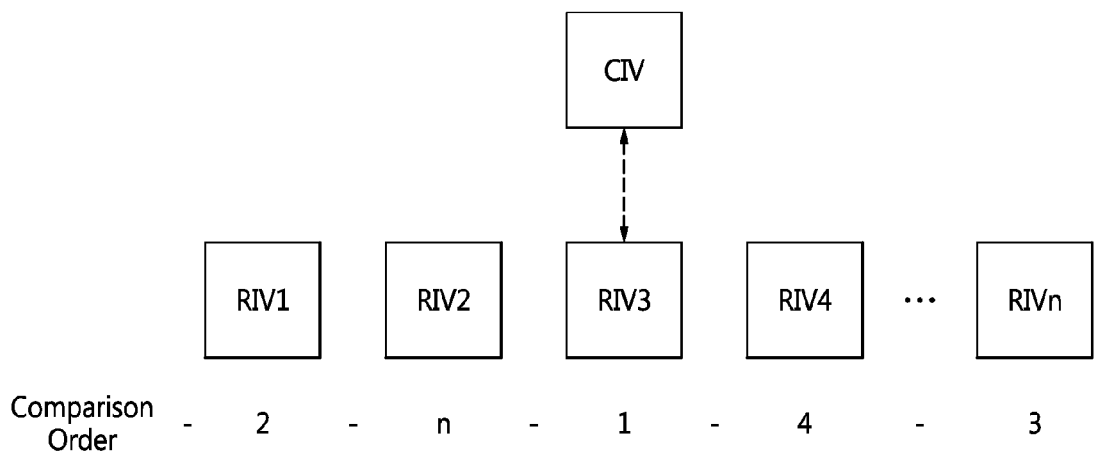
FIG. 18 is a conceptual diagram describing an operation of controller that compares a current input value with a reference input value having a highest frequency of use among reference input values.

FIG. 18 is a conceptual diagram describing an operation of controller that may be used to compare a current input value with a reference input value which has a highest frequency of use among reference input values. Referring to FIGS. 16, 17 and 18, when a user defines each function of each application program using sequential gestures, a security function of the wrist watch 100 can be reinforced.

As shown in FIG. 18, when a function corresponding to a reference input value RIV3 has a highest frequency of use, the CPU 232 or the sensing application program SAPP firstly compares a current input value CIV with the reference input value RIV3, secondly compares the current input value CIV with a reference value RIV1, and lastly compares the current input value CIV with a reference input value RIV2.

Accordingly, even if the number of reference input values increases due to sequential gestures, time for comparison can be reduced.

A computer program which can execute a method of operating a wrist watch according to an exemplary embodiment of the present inventive concepts, e.g., a sense application program, may be stored in the memory 214.

A wrist watch according to embodiments of the inventive concept allows a user to instantly operate the wrist watch without use of the other hand not wearing the wrist watch.

A user of the wrist watch according to an exemplary embodiment of the present inventive concepts can set or allocate one reference input value to each function of each application program, such that the wrist watch interprets a current input value for an application program executed in a foreground, an application program which has a highest frequency of use, or an application program set as a default by a user, and promptly perform a function of a desired application program according to a result of the interpretation.

Although a few embodiments of the inventive concept have been shown and described, it will be appreciated by those skilled in the art that changes may be made in these embodiments without departing from the scope of the appended claims and their equivalents.

What is claimed is:

1. A method of operating a wrist watch when worn by a user, the wrist watch including a user interface, and the method comprising:
   storing a plurality of applications in a main memory disposed in the wrist watch, wherein the plurality of applications comprises a first application including a first function and a second function, a second application including a third function and a fourth function, and a sensing application;
   executing the sensing application to allocate a first finger gesture to the first function, such that a subsequent making of the first finger gesture by the user while executing the first application initiates the first function; and
   executing the sensing application to allocate the first finger gesture to the third function, such that a subsequent making of the first finger gesture by the user while executing the second application initiates the third function,
   wherein the first application or the second application is designated as a default application selected for execution when the wrist watch exits an idle state, and
   wherein the idle state is exited responsive to an allocated finger gesture by the user, and a current input value generated in response to a sense signal generated in response to the allocated finger gesture is compared with each of reference values of the default application to select a corresponding function from among functions of the default application.

2. The method of claim 1, further comprising:
   executing the sensing application to allocate a second finger gesture to the second function, such that a subsequent making of the second finger gesture by the user while executing the first application initiates the second function.

3. The method of claim 2, further comprising:
   executing the sensing application to allocate a third finger gesture to the fourth function, such that a subsequent making of the third finger gesture by the user while executing the second application initiates the fourth function.

4. The method of claim 1, wherein the first function and the third function are different functions.

5. The method of claim 1, further comprising:
   defining a first reference value, from among the reference values, for the first function; and
   selecting and executing the first application as a target application in response to a first user input made via the user interface, wherein during execution of the first application, the sensing application generates a first current input value in response to a first sense signal generated in response to the first finger gesture, compares the first current input value with the first reference value, and executes the first function in response to the comparison of the first current input value to the first reference value.

6. The method of claim 5, further comprising:
   defining a second reference value, from among the reference values, for the second function, wherein during execution of the first application, the sensing application generates a second current input value in response to a second sense signal generated in response to a second finger gesture, compares the second current input value to the second reference value, and executes the second function in response to the comparison of the second current input value to the second reference value.

7. The method of claim 6, further comprising:
   storing the first reference value and the second reference value in a secondary memory internal to a system-on-chip (SoC) and separate from the main memory.

8. The method of claim 1, wherein the wrist watch comprises a device module attached to a wrist band,
   a first sensor is disposed on an inner surface of the device module and a second sensor is disposed on an inner surface of the wrist band opposite the first sensor when the wrist watch is worn by the user.

9. The method of claim 8, wherein at least one of the first sensor and second sensor is an electromyography (EMG) sensor.

10. The method of claim 1, wherein the executing of the sensing application to allocate the first finger gesture to the first function and the executing of the sensing application to allocate the first finger gesture to the third function are performed during a set-up operation for at least one of the wrist watch and a target application.

11. A wrist watch configured to be worn by a user, the wrist watch comprising:
    a wrist band attached to a device module;
    at least one sensor disposed on at least one of the wrist band and the device module,
    wherein the device module comprises
       a main memory that stores a plurality of applications, wherein the plurality of applications comprises a first application including a first function and a second application including a second function, and a sensing application; and
       a processor that executes the sensing application, wherein the sensing application allocates a finger gesture to the first function, such that a subsequent making of the finger gesture by the user while executing the first application initiates the first function, and allocates the finger gesture to the second function, such that making of the finger gesture by the user while executing the second application initiates the second function, wherein the first application or the second application is a default application designated for execution when the wrist watch exits an idle state, and wherein the idle state is exited responsive to an allocated finger gesture by the user, and a current input value generated in response to a sense signal generated in response to the allocated finger gesture is compared with each of reference values of the default application to select a corresponding function from among functions of the default application.

12. The wrist watch of claim 11, wherein the at least one sensor includes a first sensor disposed on an inner surface of the device module and a second sensor disposed on an inner surface of the wrist band opposite the first sensor when the wrist watch is worn by the user.

13. The wrist watch of claim 11, wherein the device module further comprises:

modules executable by the processor in response to respective execution of each one of the plurality of applications, wherein the modules include at least two of a multimedia module, a wireless communication module, a vibration module, a microphone, and a data link module.

14. The wrist watch of claim 11, wherein the device module further comprises a user interface, the processor selects one of the plurality of applications as a target application in response to user input received via the user interface and runs the target application as a background operation of the wrist watch, and thereafter, upon receiving an interrupt signal generated in response to the sensing application, the target application begins running as a foreground operation of the wrist watch.

15. The wrist watch of claim 11, wherein the target application is an operating system.

16. A processor configured in a wearable user device, comprising:

a user interface;
at least one sensor;
a main memory that stores a plurality of applications including a first application including first and second functions, a second application including third and fourth functions, and a sensing application; and
a central processing unit (CPU) that selects a target application from among the plurality of applications in response to input by a user received via the user interface,
wherein prior to selection of the target application, the sensing application allocates a first finger gesture to the first function, such that a subsequent making of the first finger gesture by the user while executing the first application initiates the first function, and allocates the first finger gesture to the third function, such that a subsequent making of the first finger gesture by the user while executing the second application initiates the third function, and one of the first application and the second application is a default application designated for execution when the wearable user device exits an idle state, and wherein the idle state is exited responsive to an allocated finger gesture by the user, and a current input value generated in response to a sense signal generated in response to the allocated finger gesture is compared with each of reference values of the default application to select a corresponding function from among functions of the default application.

17. The processor of claim 16, further comprising:

a secondary memory that stores the reference values for the functions of each one of the plurality of applications, wherein the CPU defines a first reference value, from among the reference values, for the first function and stores the first reference value in the secondary memory, and upon selecting and executing the first application as the target application in response to user input received via the user interface, the sensing application generates a first current input value in response to a first sense signal generated in response to the first finger gesture, compares the first current input value with the first reference value, and executes the first function in response to the comparison of the first current input value to the first reference value.

18. The processor of claim 17, wherein the secondary memory is disposed in a system-on-chip (SoC) separate from the main memory.

19. The processor of claim 16, wherein the wearable user device comprises a device module attached to a wrist band, and the at least one sensor comprises a first sensor disposed on an inner surface of the device module and a second sensor disposed on an inner surface of the wrist band opposite the first sensor when the wearable user device is worn by the user.

20. The processor of claim 19, wherein the first sensor and the second sensor are electromyography (EMG) sensors.

* * * * *